(12) United States Patent
Li et al.

(10) Patent No.: US 8,224,335 B2
(45) Date of Patent: Jul. 17, 2012

(54) METHOD AND SYSTEM FOR SUPPORTING DISTRIBUTED IMS CHARGING

(75) Inventors: Xiangyang Li, Shanghai (CN); Hongmei Du, Shanghai (CN); Peng Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 112 days.

(21) Appl. No.: 12/733,915

(22) PCT Filed: Oct. 30, 2007

(86) PCT No.: PCT/CN2007/003084
§ 371 (c)(1),
(2), (4) Date: Mar. 26, 2010

(87) PCT Pub. No.: WO2009/055960
PCT Pub. Date: May 7, 2009

(65) Prior Publication Data
US 2010/0248685 A1    Sep. 30, 2010

(51) Int. Cl.
*H04W 4/24* (2009.01)
(52) U.S. Cl. ....... 455/445; 455/90.2; 455/413; 455/555; 370/252; 370/254
(58) Field of Classification Search .......... 370/252, 370/254; 455/90.2, 413, 555, 445
See application file for complete search history.

(56) References Cited

U.S. PATENT DOCUMENTS

| | | | |
|---|---|---|---|
| 7,260,384 B2 * | 8/2007 | Bales et al. | 455/413 |
| 8,060,135 B2 * | 11/2011 | Bales et al. | 455/555 |
| 8,064,951 B2 * | 11/2011 | Woodson et al. | 455/555 |
| 2009/0023399 A1 * | 1/2009 | Lindgren et al. | 455/90.2 |
| 2009/0103455 A1 * | 4/2009 | Balasubramanian et al. | 370/254 |
| 2010/0189004 A1 * | 7/2010 | Mirandette et al. | 370/252 |

* cited by examiner

*Primary Examiner* — William D Cumming
(74) *Attorney, Agent, or Firm* — Carmen Patti Law Group, LLC (57) ABSTRACT

The present invention relates to communication technology, and in particular, to a method, apparatus and system for supporting distributed IMS charging. The system for supporting distributed IMS charging, comprises: a plurality of nodes, and a index server (101) interconnecting the plurality of nodes, in a network; wherein, a first node (102) sends a charging request to the index server (101), the index server (101) routes the charging request to a second node (103) adapted to charge based on the charging request or returns an address of the second node (103) to the first node (102) and then the first (102) node sends the charging request to the second node (103) with the address from the index server (101); and the second node (103) charges based on the charging request. This invention enables an operator to manage the subscriber's charging location information for distributed charging services in a centralized index server, instead of provisioning the charging locations in each separated IMS charging system. This invention greatly saves the operator's management cost of charging.

14 Claims, 13 Drawing Sheets

Prior art

CTF: Charging Trigger Function
CDF: Charging Data Function
CGF: Charging Gateway Function
BD: Billing Domain. This may also be a billing system/ billing mediation device.

prior art

Fig.12

CTF: Charging Trigger Function
OCF: Online Charging Function
ABMF: Account Balance Management Function
RF: Rating Function prior art

Fig.13

METHOD AND SYSTEM FOR SUPPORTING DISTRIBUTED IMS CHARGING

TECHNICAL FIELD

The present invention relates to communication technology, and in particular, to a method, apparatus and system for supporting distributed IMS charging.

TECHNICAL BACKGROUND

As set forth in the 3rd Generation Partnership Project (3GPP), an IP Multimedia Subsystem (IMS) provides a common core network having access-agnostic network architecture for converged networks. Service providers are accepting this architecture in next generation network evolution. The IMS architecture is initially defined by the 3GPP to provide multimedia services to mobile subscribers over an IP network. IP networks have become the most cost savings bearer network to transmit video, voice, and data.

IMS uses the advantage of IP networks to provide multimedia services for IMS subscribers on an IMS platform. The signaling used within IMS networks is SIP protocol. IMS defines the standard SIP interface between application servers, the IMS core network (CSCF), the IMS subscriber, the IMS database (HSS), and IMS billing elements. These standards can reduce the network integration costs and let the subscriber enjoy more stable services.

On the IMS platform, the traditional supplementary services, such as call forwarding, conferencing, and call waiting could be available for IMS subscribers. Also, many new data services, such as instant messaging, video calls, video on wait, and web-based services, will also be available for the IMS subscribers.

Figure 10:
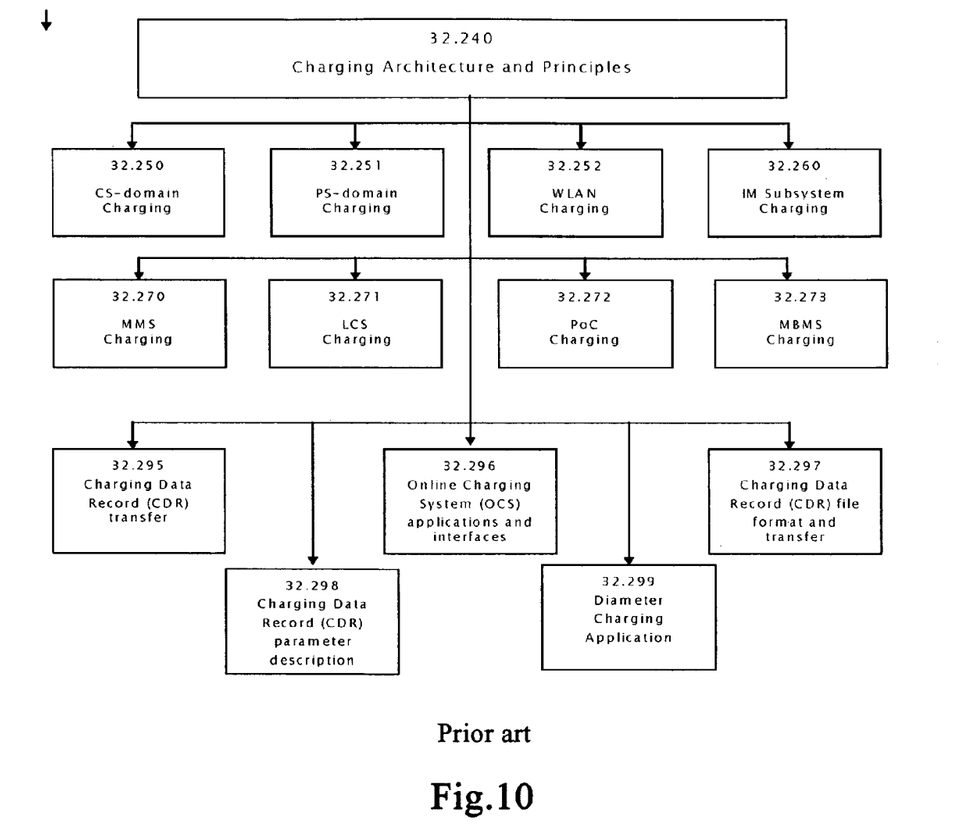
FIG. 10 is a schematic diagram showing the structure of the charging specifications of 3GPP TS 32.240 V7.0.0.

Providing efficient IMS online charging for operator revenue generation is important to the successful deployment of IMS networks. Several 3GPP technical specifications describe charging for IMS networks. For instance, the structure of the charging specifications of 3GPP TS 32.240 V7.0.0 (2006-09), which can be found at http://www.3gpp.org, is shown in FIG. 10.

Figure 11:
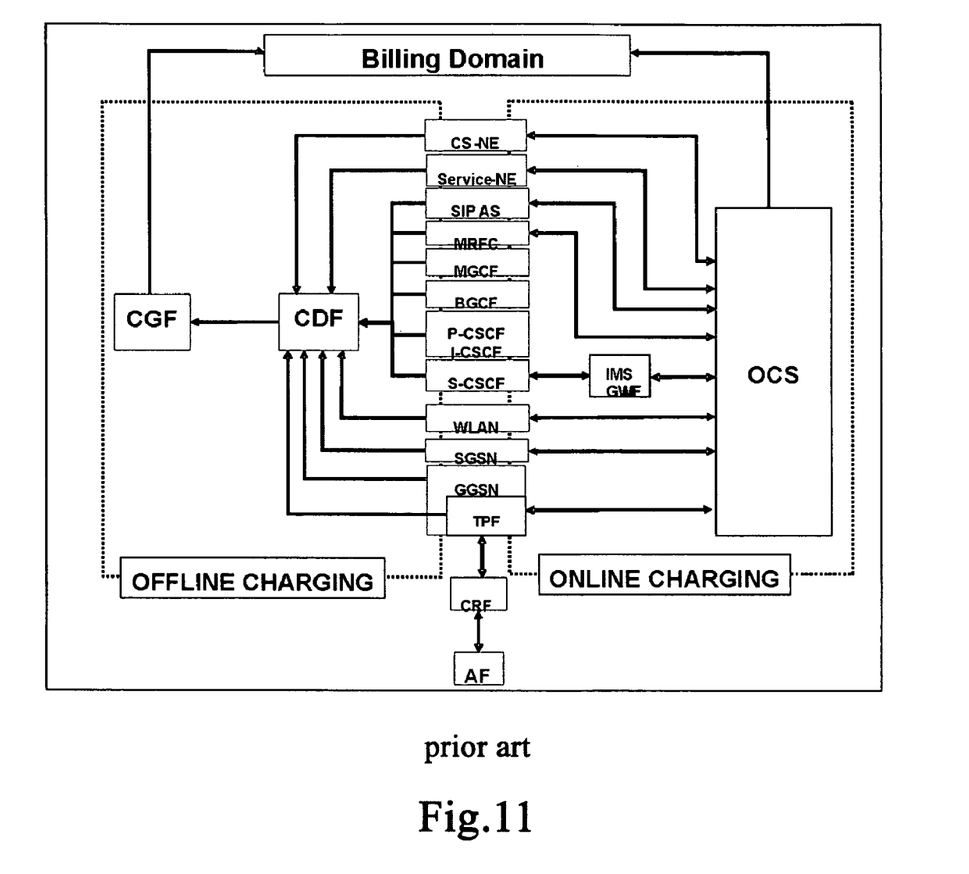
FIG. 11 is a schematic diagram showing the logical ubiquitous charging architecture and information flows according to the prior art.

FIG. 11 provides an overview of the logical ubiquitous charging architecture and the information flows for offline and online charging. The common charging functions are detailed further in FIG. 12 for offline charging and FIG. 13 for online charging.

FIG. 11 includes all network elements/systems (top to bottom: CS-NE all the way through to the TPF) for which charging is defined within 3GPP standards. The arrows indicate logical information flows on the Rf, Wf, Ga, Bx, ISC, Ro, Wo, CAP, and Gy reference points.

Figure 12:
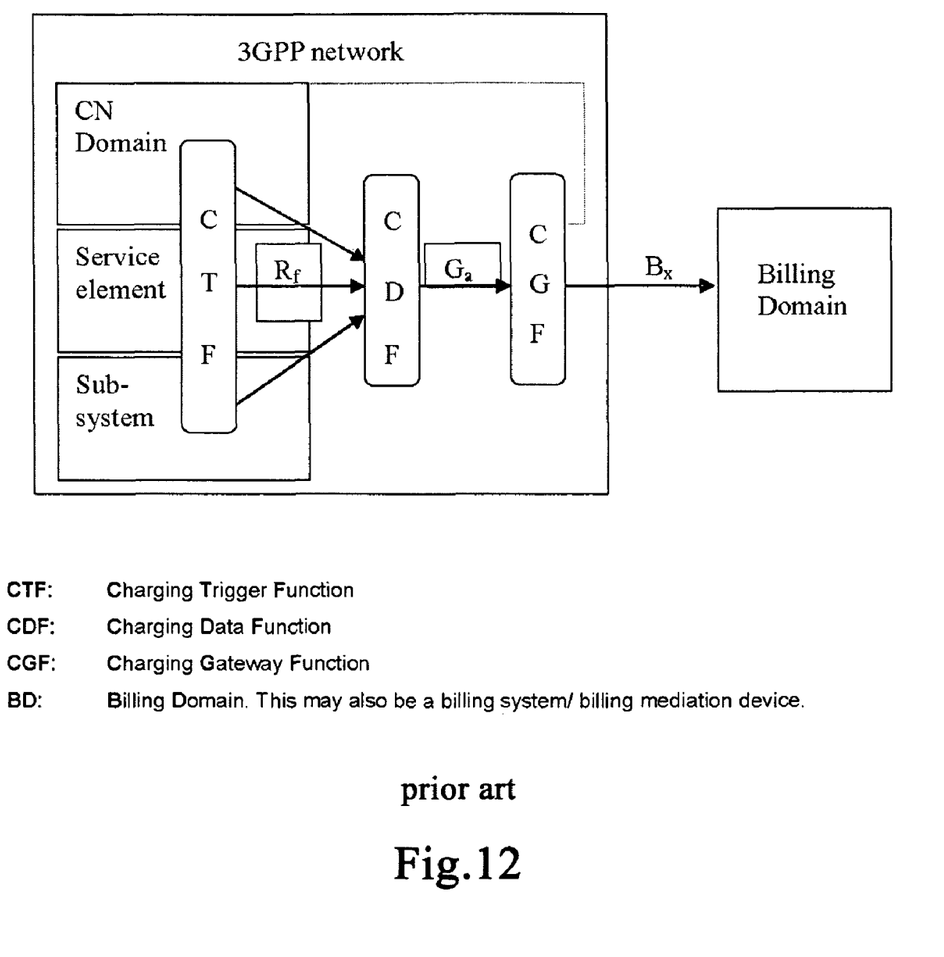
FIG. 12 is a schematic diagram showing the logical ubiquitous offline charging architecture according to the prior art.

FIG. 12 provides an overview of the offline part of the common charging architecture. The figure depicts the logical charging functions as well as the reference points between these functions and to the Billing Domain. The abbreviations in the figure have the meanings respectively as follows: CTF: Charging Trigger Function; CDF: Charging Data Function; CGF: Charging Gateway Function; BD: Billing Domain, which may also be a billing system/billing mediation device.

The Charging Trigger Function (CTF) generates charging events based on the observation of network resource usage. In every network and service element that provides charging information, the CTF is the focal point for collecting the information pertaining to chargeable events within the network element, assembling this information into matching charging events, and sending these charging events towards the Charging Data Function. The CTF is therefore a mandatory, integrated component in all network elements that provide offline charging functionality.

The Charging Data Function (CDF) receives charging events from the Charging Trigger Function via the Rf reference point. The relationship between CDF and CTF may be 1:1 (integrated CDF) or 1:n (separated CDF). It then uses the information contained in the charging events to construct Charging Data Records (CDRs).

The results of the CDF tasks are CDRs with a well-defined content and format. The content and format of these CDRs are specified per domain/subsystem/service in the related middle tier charging specification (e.g. 3GPP TS 32.250 [10] for the CS domain and 3GPP TS 32.251 [11] for the PS domain, etc,).

The CDRs produced by the CDF are transferred immediately to the Charging Gateway Function (CGF) via the Ga reference point. The CGF acts as a gateway between the 3GPP network and the Billing Domain. It uses the Bx reference point for the transfer of CDR files to the BD. The entity relationship between the CDF and the CGF is m:1, i.e. one or more CDFs may feed CDRs into a single CGF.

Figure 13:
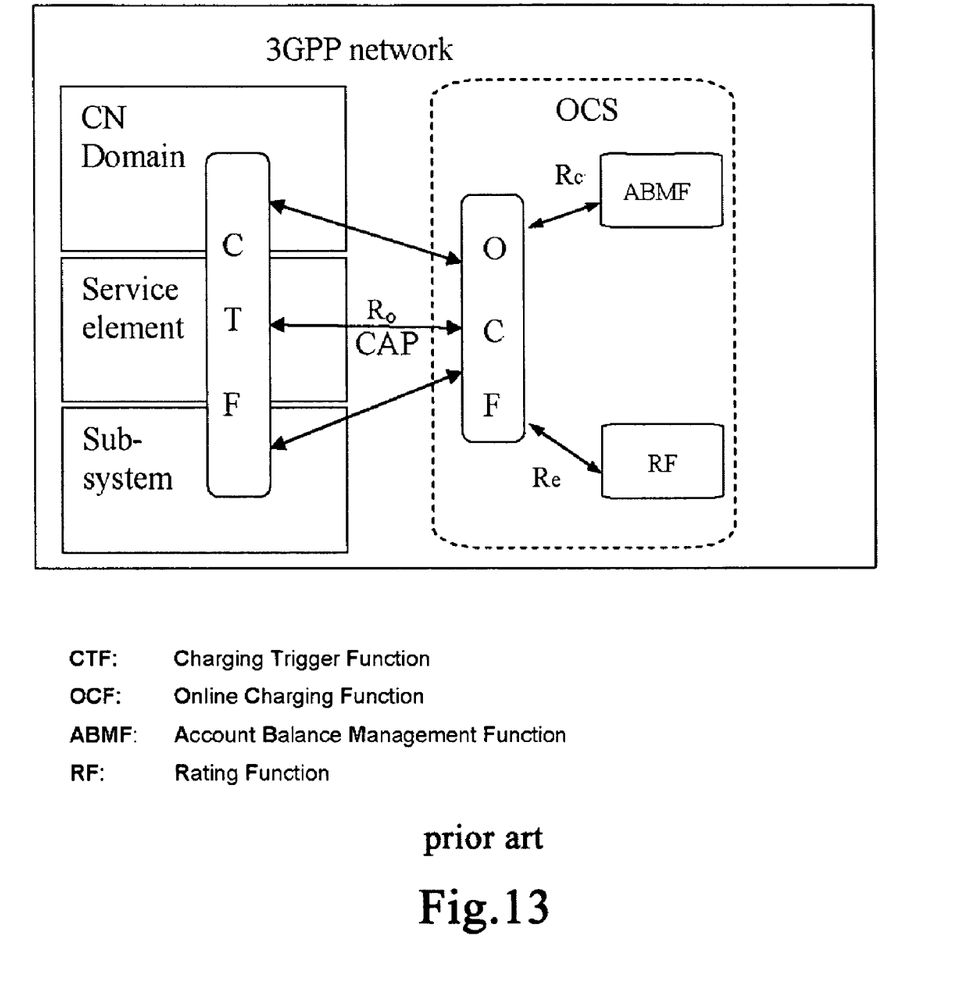
FIG. 13 is a schematic diagram showing the logical ubiquitous online charging architecture according to the prior art.

FIG. 13 provides an overview of the online part of the common charging architecture. The figure depicts the logical charging functions in the network and the OCS and the reference points between these functions. The abbreviations in the figure have the meanings respectively as follows: CTF: Charging Trigger Function; OCF: Online Charging Function; ABMF: Account Balance Management Function; RF: Rating Function.

The traditional telecommunication charging system can be divided into two domains: prepaid and postpaid systems. The prepaid system is a kind of charging service for a subscriber who firstly purchases the access and airtime prior to use. The IN-based prepaid charging is used to real-time monitor the airtime usage, which is purchased by the prepaid subscriber in advance. The postpaid system is a kind of charging service to allow a subscriber to firstly use a network before the payment to the network usage. IT-based postpaid system is used to collect and rate the subscriber's call data record (CDR) in batch mode, and generate the postpaid subscriber's bill and invoice.

3GPP, from another angle, divides the charging systems into online charging system and offline charging system. For the offline charging mechanism, charging information does not affect, in real-time, the service rendered. For the online charging mechanism, the charging information can affect, in real-time, the service rendered and therefore a direct interaction of the charging mechanism with session/service control is required. The 3GPP doesn't limit that online or offline charging must be the prepaid or post-paid payment. The online charging can be prepaid or post-paid, and offline charging can be prepaid or post-paid payment, too.

The 3GPP charging specification only defines the basic online/offline charging framework for various networks. The multiple IMS charging system inter-working is never mentioned in these specifications, such as multiple online charging system (OCS) inter-working for group charging, charging gateway function (CGF) and OCS networking for offline and online charging convergence, charging trigger function (CTF) with multiple OCS and multiple charging data function (CDF) inter-working, etc. In a multiple charging system, how to manage the charging locations of these subscribers is performed by a distributed group charging server.

In an existing market, either in the online/offline system or in the prepaid/post-paid charging systems, all subscribers or end users are regards as individuals by mobile operators. The end user individually subscribes mobile services, manages its own account, and pays mobile service usage.

In competitive telecommunication market, most of operators have great challenge to extend subscriber base, increase revenue, reduce customer churn, and save customer acquisition, operation and maintenance cost. To breakthrough the individual service subscription market drawback, some operators are trying to position the subscribers as group, and are seeking to bundle or cluster subscriber together to provide advanced real-time usage and cost charging plan, but these subscribers charging profile is distributed in multiple charging system. For illustration purpose, the following two examples are for the distributed charging services.

Intra Class of Service Charging

When subscriber A (sub A) makes a call to subscriber B (sub B), if sub A and sub B belongs to the same class of a server, the sub A's call charge will have some discount for the intra class of service call. Sub A's account profile is provisioned in OCS 1 (e.g. located in New York), while Sub B's account profile is provision in OCS 2 (e.g. located at Chicago). OCS 1 needs to communicate with OCS 2 to query subscriber B's class of service in B's account profile to determine whether sub A and sub B belong to the same class of service.

Distributed Family Plan

A group of family members are distributed over multiple OCSs. For example, the child's account profile is provisioned in an OCS located in Milan, and the parent's account profile is provisioned in an OCS located in Roma. When the child wants to share the parent's balance or bonus, the OCS with the child' account profile needs to communicate with the OCS with parent's account profile to get parent's balance and bonus.

The prior art work in 3GPP standard specification set doesn't define how to implement the distributed IMS charging, such as CGF and OCS inter-working, multiple OCS inter-working, etc. And the existing solution for charging have both the technical and business disadvantage for this distributed IMS charging. This invention shall fix the standard gap for above problems.

The index service solution is a first-ever seen solution to realize the centralized management of charging system addresses. This invention enables an operator to manage the subscriber's charging location information for distributed charging services in a centralized index server, instead of provisioning the charging locations in each separated IMS charging system. This invention greatly saves the operator's management cost of charging.

SUMMARY OF THE INVENTION

In order to solve the above-mentioned problems, the present invention provides a method, apparatus and system for supporting distributed IMS charging.

According to an aspect of the present invention, there is provided a system for supporting distributed IMS charging, comprising: a plurality of nodes, and a index server interconnecting the plurality of nodes, in a network; wherein, a first node sends a charging request to the index server, the index server routes the charging request to a second node adapted to charge based on the charging request or returns an address of the second node to the first node and then the first node sends the charging request to the second node with the address from the index server; and the second node charges based on the charging request.

According to another aspect of the present invention, there is provided a method for supporting distributed IMS charging, comprising: sending a charging request to a index server in a network by a requesting node; routing the charging request to a charging node in the network by the index server, wherein the charging node is responsible for charging according to the charging request; or returning an address of the charging node to the requesting node by the index server, and then sending the charging request to the charging node with the address from the index server by the requesting node; and charging based on the charging request by the charging node.

According to still another aspect of the present invention, there is provided an apparatus for supporting distributed IMS charging, which locates in a network comprising a plurality of nodes, receives a charging request from a requesting node in the network and then routes the charging request to a charging node in the network, which is responsible for charging according to the charging request, or returns an address of the charging node to the requesting node, and wherein, the apparatus comprises a charging index database which includes information about the nodes in the network.

BRIEF DESCRIPTION OF THE DRAWINGS

It is believed that through following detailed description of the embodiments of the present invention, made in conjunction with the drawings, above-mentioned features, advantages, and objectives will be better understood.

DETAILED DESCRIPTION OF THE INVENTION

Next, a detailed description of the preferred embodiments of the present invention will be given in conjunction with the drawings.

Figure 1:
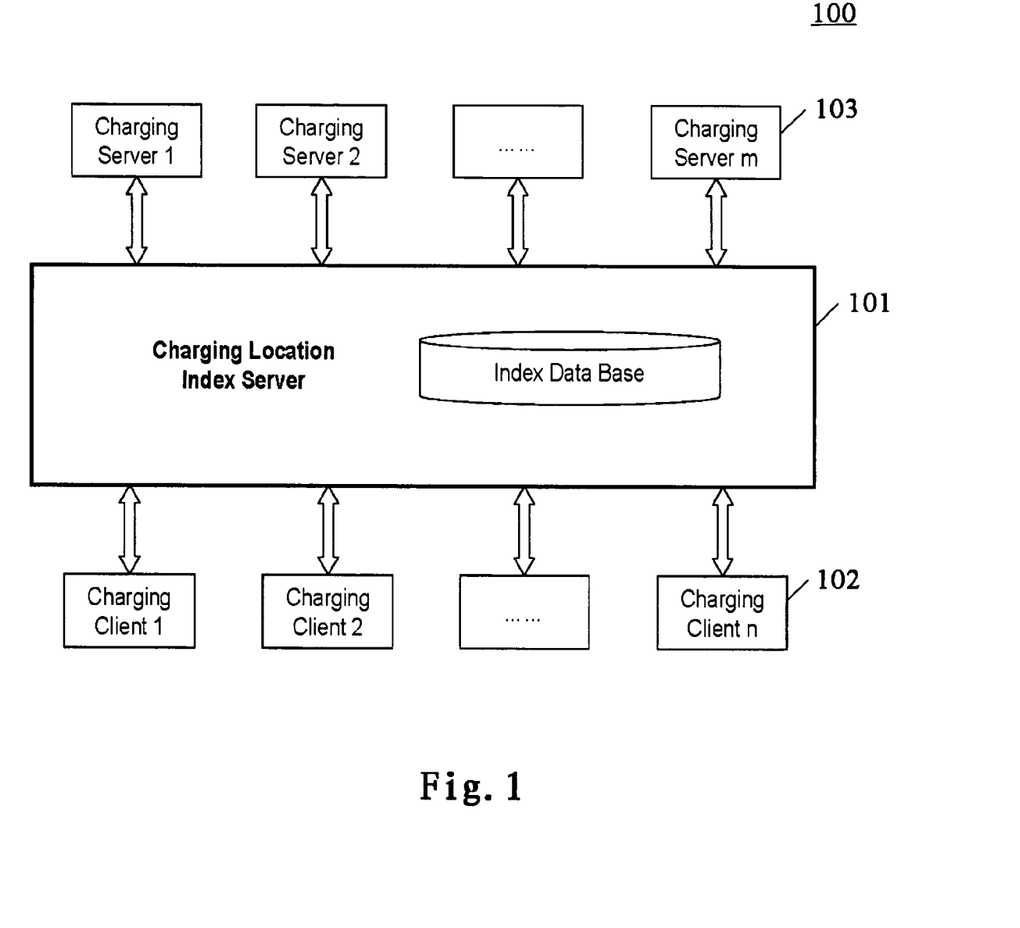
FIG. 1 is a block diagram showing the configuration of a charging location index system for supporting distributed IMS charging according to an embodiment of the present invention.

FIG. 1 is a block diagram showing the configuration of a charging location index system for supporting distributed IMS charging according to an embodiment of the present invention.

As shown in FIG. 1, a charging location index system 100 includes a charging location index server 101, a plurality of charging clients 102 and a plurality of charging servers 103. Moreover, the network interconnecting the charging location index server 101, the charging clients 102 and the charging servers 103, includes but not limited to 3GPP network or 3GPP2 network.

This invention creates an innovative charging location index server infrastructure (see FIG. 1) to concentratively manage the storage location of subscriber's charging account profile, and the unified location index server 101 enables to support the various distributed IMS charging services, which the subscriber's account profile can be distributed over multiple charging systems.

The charging location index server 101 maintains an index database to store the addresses indicating the locations of the online charging and/or offline charging servers 103 in the network (hereafter, the address is called charging server address). Furthermore, each charging client 102 will care for [Mr Lil] each subscriber's detailed charging location information.

The index server 101 will use the subscriber identifier, which is included in the charging request from the charging client 102, for querying the index server 101 to get the address of each subscriber's charging server 103. The charging request from the charging client 102 will be routed to the correct charging server 103 based on the charging server address obtained from the index server 101. Then the charging server 103 can charge responsive to the charging request.

Figure 2:
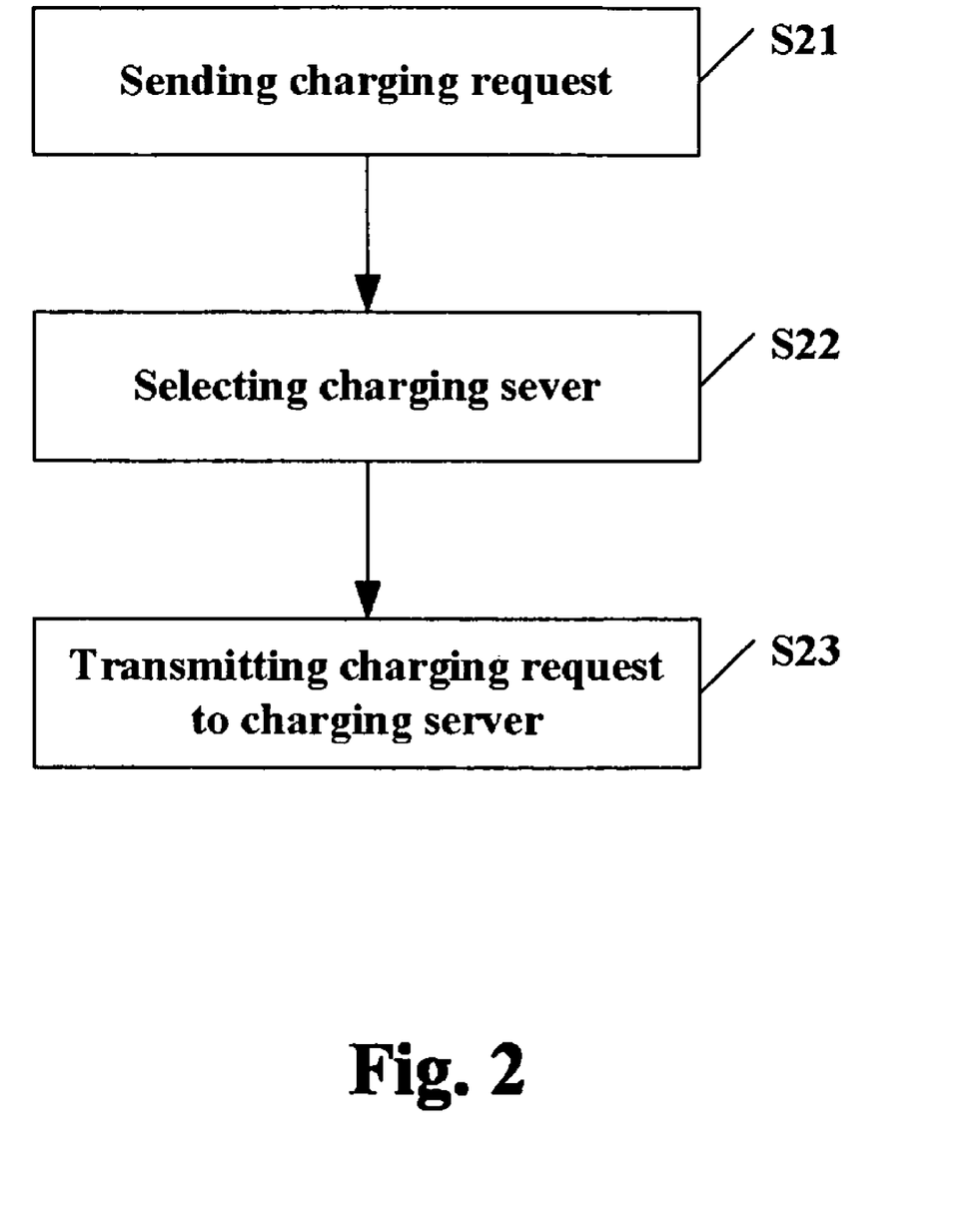
FIG. 2 is a flow chart showing a charging location index progress in the system shown in FIG. 1.

FIG. 2 is a flow chart showing a charging location index progress in the system shown 100 in FIG. 1.

First, a charging request is sent to the charging location index server 101 by the charging client 102 (S21). Then the index server 101 selects a charging server 103 (S22) which is able/suitable to charge according to the charging request, and transmits the charging request to the selected charging server 103 (S23).

Figure 3:
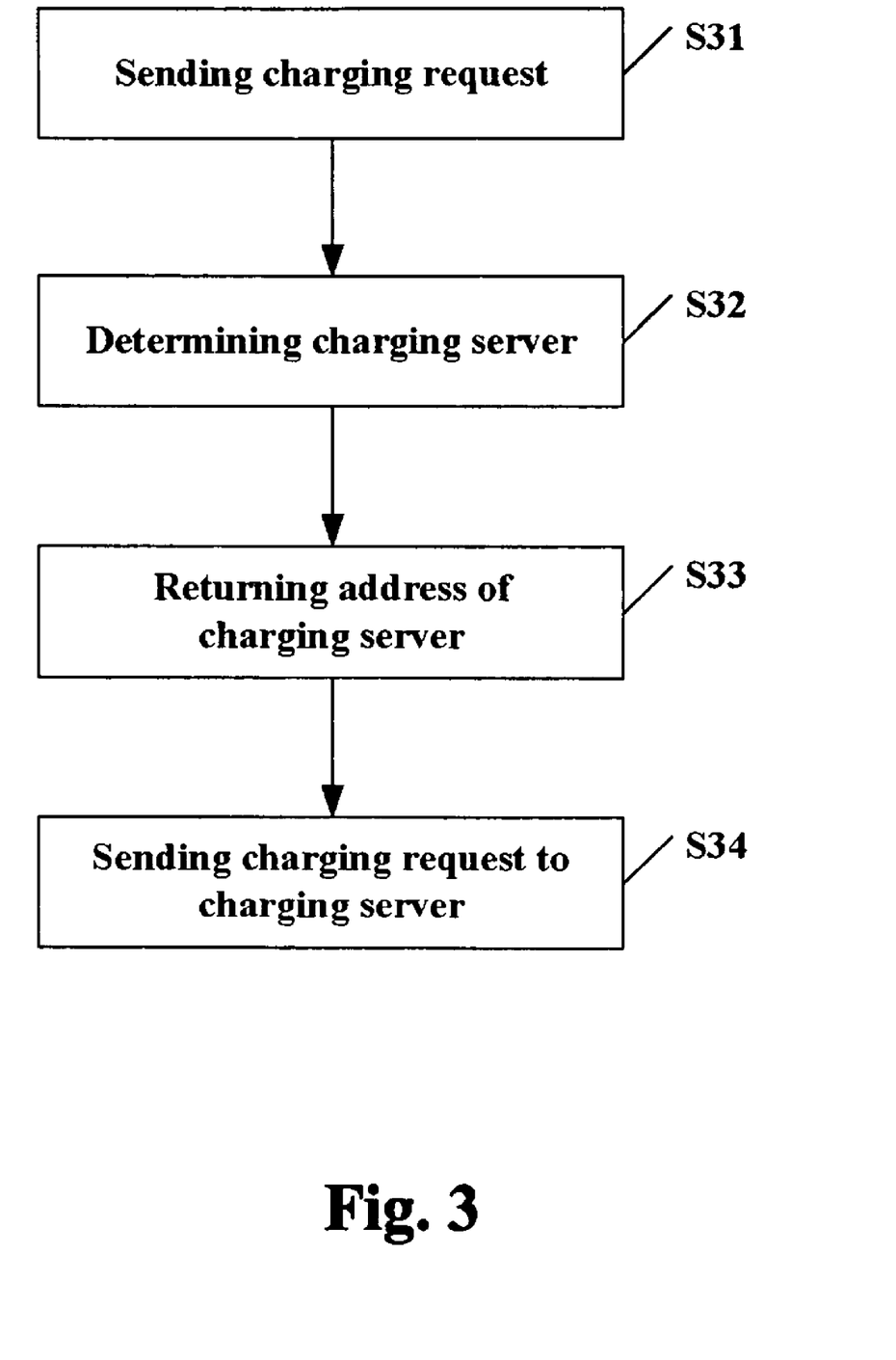
FIG. 3 is a flow chart showing another charging location index progress in the system shown in FIG. 1.

FIG. 3 is a flow chart showing another charging location index progress in the system 100 shown in FIG. 1.

Similarly at start, a charging request is sent to the charging location index server 101 by the charging client 102 (S31). Then the index server 101 determines a charging server 103 (S32) which is able/suitable to charge according to the charging request, and returns the address of the charging server 103 to the charging client 102 (S33). Then charging client 102 then sends the charging request to the determined charging server 103 (S34).

Figure 4:
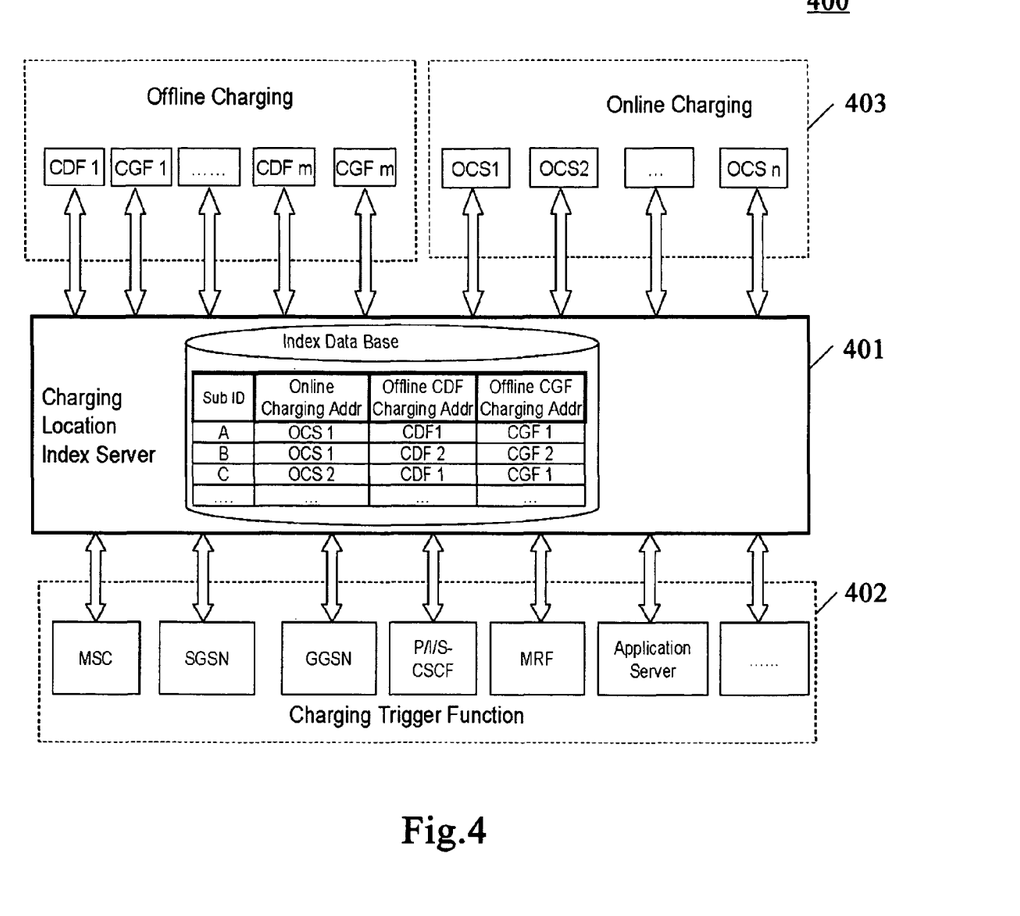
FIG. 4 is a schematic diagram showing the configuration of a charging location index system for supporting distributed IMS charging according to an embodiment of the present invention.

FIG. 4 is a schematic diagram showing the configuration of a charging location index system for supporting distributed IMS charging according to an embodiment of the present invention.

In the charging location index system 400 shown in FIG. 4,
The charging client 402 can be the following at least:
CTF (charging trigger function, such as P-CSCF, I-CSCF, S-CSCF, Application Server, etc.)
OCS (online charging system)
CGF (charging gateway function)
The charging server 403 can be the following at least:
CDF (charging data function)
CGF (charging gateway function)
OCS (online charging system)
As the example in FIG. 4, subscriber A's online charging address is OCS 1, its offline charging address is CDF1; subscriber B's online charging address is also OCS1, but its offline charging address is CDF2; subscriber C's online charging address is OCS2, its offline charging address is CDF 1, etc.

Figure 5:
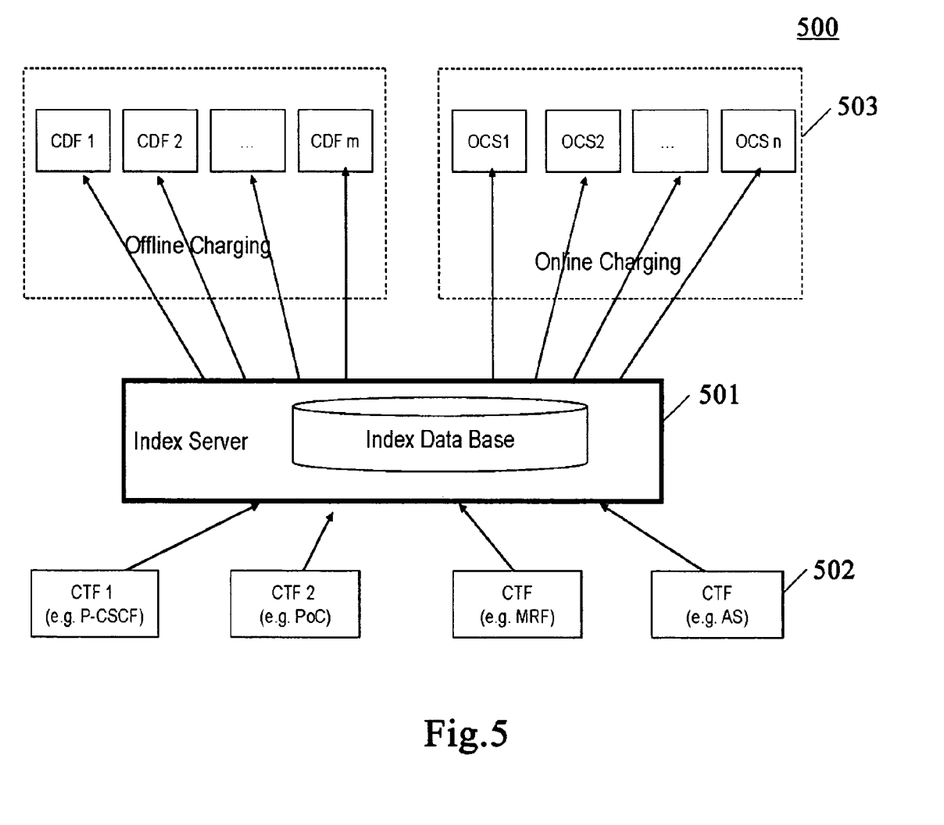
FIG. 5 is a schematic diagram showing the topology of a charging system network according to an embodiment of the present invention, which hides from charging trigger functions.

The index server 401 supports at least the following scenarios for the distributed charging services.
CTF and OCS/CDF inter-working for online or offline charging
Multiple OCS inter-working for online group charging
CDR routing based on subscriber information from CDF to CGF
CGF and OCS inter-working for online and offline convergence FIG. 5 is a schematic diagram showing the topology of a charging system network according to an embodiment of the present invention, which hides from charging trigger functions. As shown in FIG. 5, the index server 501 can implement the charging system network topology hiding from the charging trigger functions, such as IMS P/I/S-CSCF, application server, MSC, etc, charging clients 502. The charging trigger function needn't to maintain the charging server address for each subscriber. The charging trigger function only needs to know the charging index server's address. The index server 501 will determine that the charging request from CTF shall be redirected to which charging system 503, e.g. CCF 1~m or OCS 1~n.

Figure 6:
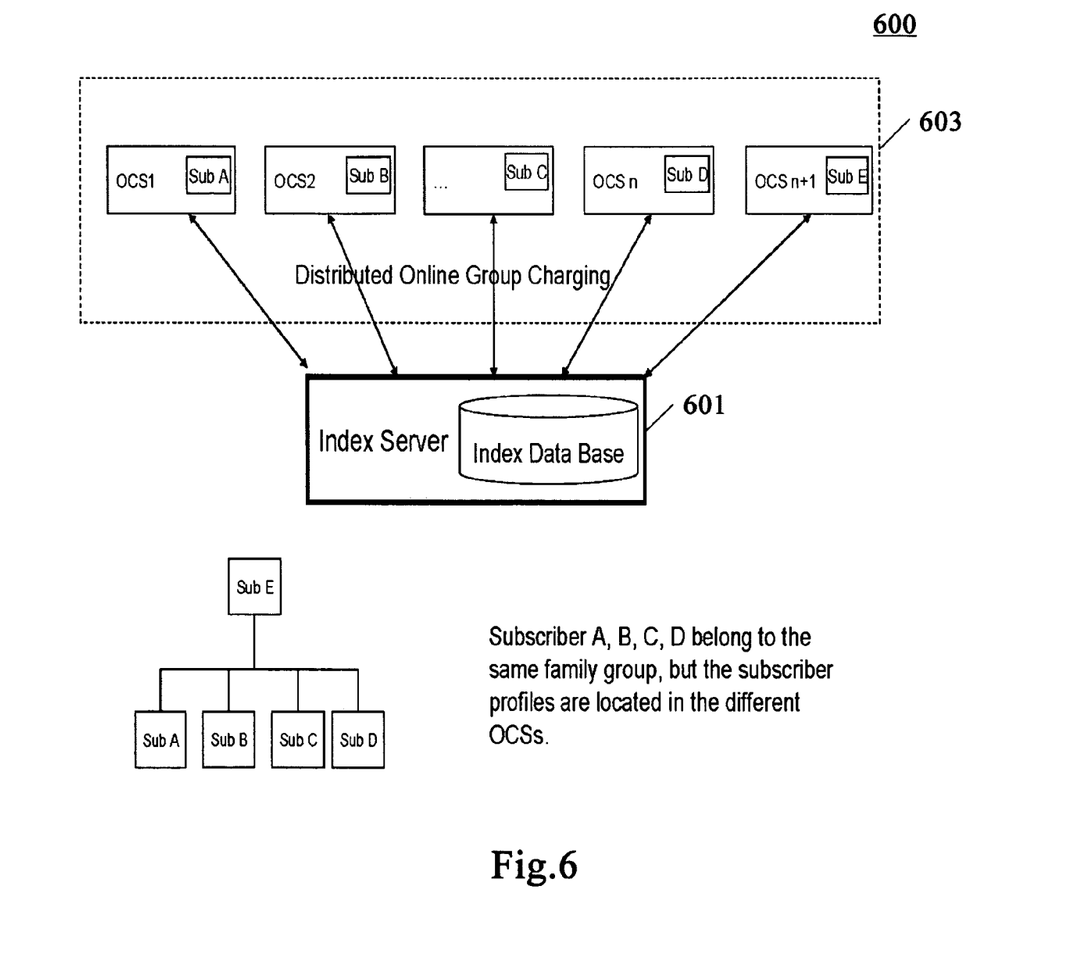
FIG. 6 is a schematic diagram showing the inter-OCS communication for distributed online group charging according to an embodiment of the present invention.

FIG. 6 is a schematic diagram showing the inter-OCS communication for distributed online group charging according to an embodiment of the present invention. As shown in FIG. 6, the index server 601 can also implement the OCS inter-working for the distributed online group charging services. In the distributed charging services, when OCS performs the rating and charging for one subscriber, it needs to query another subscriber profile, which is stored in another OCS. The OCS inter-working examples are as the following for the distributed charging.

Intra Class of Service Charging
Subscriber A's account profile is provisioned in OCS 1, and subscriber B's account profile is provision in OCS 2. Via the index server 601, OCS 1 can communicate with OCS 2 to query sub B's account profile to determine whether sub A and sub B belong to the same class of service. Accordingly, when sub A makes a call to sub B, if sub A and sub B belong to the same class of service, the sub A's call charge will have some discount for the intra class of service call.

Distributed Family Plan
A group of family members are distributed over multiple OCSs, such as, the account of the child and account of the parents are provisioned as the different OCSs. When the child's call wants to share the balance or bonus of the parents, the OCS with the child's account profile can communicate with another OCS with the account profile of the parents to get the parent's balance and bonus via the index server 601.

This invention enables the distributed group charging with OCS location transparency. For a group of subscribers with charging relationships, but the subscriber account profile is deployed among different OCSs, the location of each subscriber account profile is transplant from another subscriber account profile. The index server 601 realizes the centralized management of each subscriber's OCS. The index server 601 will route the charging request from one OCS to another OCS. One OCS doesn't need to store the OCS location of another subscriber. This will greatly save the storage space and system maintenance cost, and keeps the data consistency in the centralized manner in the index server 601.

Figure 7:
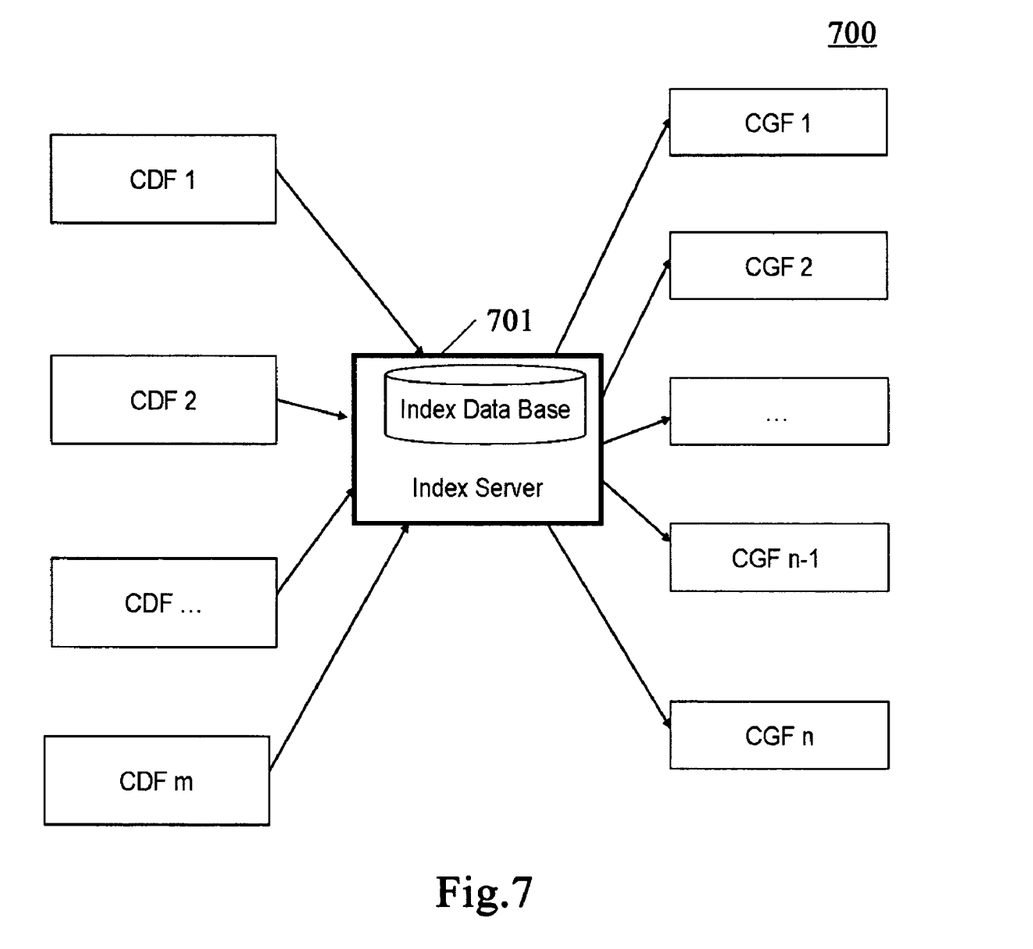
FIG. 7 is a schematic diagram showing the CDR routing based on subscriber information from CDF to CGF according to an embodiment of the present invention.

FIG. 7 is a schematic diagram showing the CDR routing based on subscriber information from CDF to CGF according to an embodiment of the present invention.

As shown in FIG. 7, this invention enables to support the subscriber based CDR (charging data record) routing from CDF to CGF. Each CDF doesn't need to maintain the subscriber's CGF location information; the index service will centralize to manage each subscriber's CGF location. When the CDF needs to route the CDR of one subscriber to a CGF, the request will be sent to index server 701, the index service will determine the routing request shall be sent to which CGF.

Figure 8:
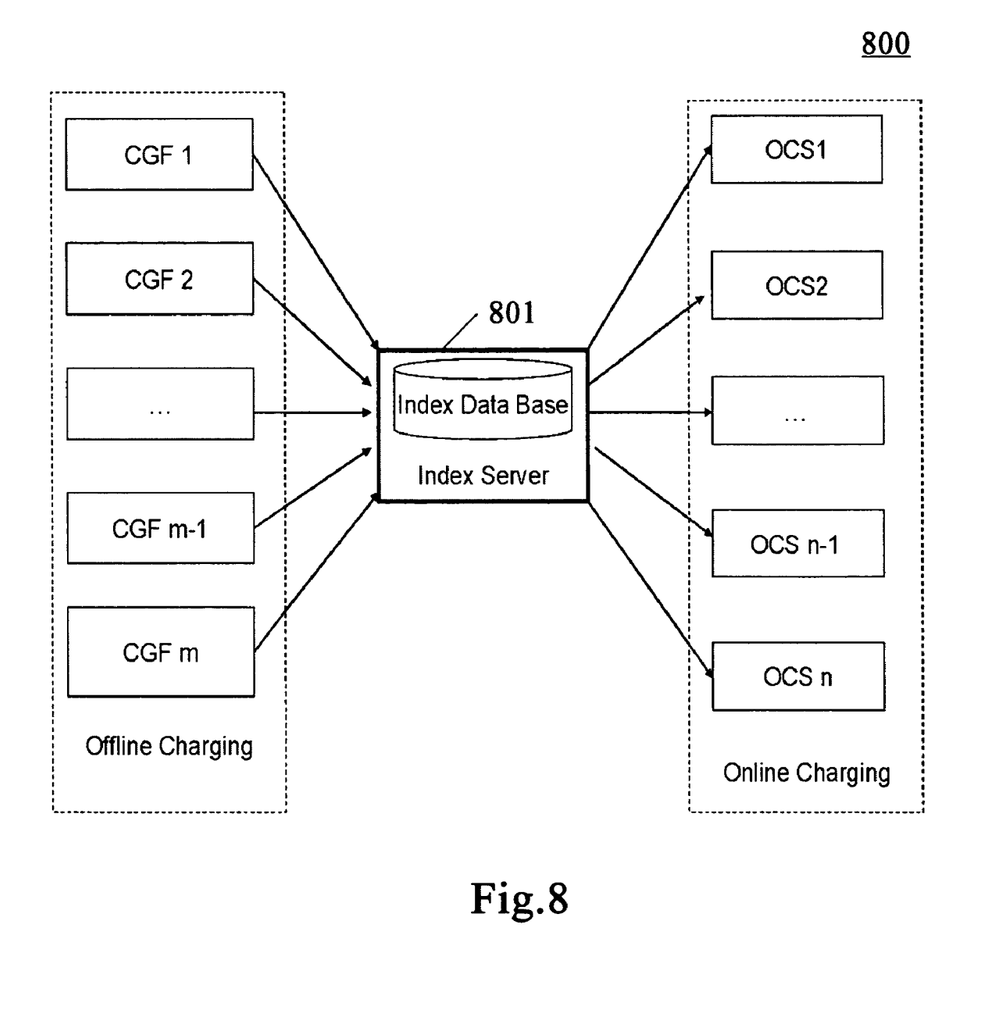
FIG. 8 is a schematic diagram showing the CGF and OCS inter-commutation for online and offline charging convergence according to an embodiment of the present invention.

FIG. 8 is a schematic diagram showing the CGF and OCS inter-commutation for online and offline charging convergence according to an embodiment of the present invention.

As shown in FIG. 8, to implement the online charging and offline charging convergence, when OCS is off-peak time, the OCS can rate the raw CDR (with cost information) from the CGF. Each CGF doesn't need to maintain the subscriber OCS address information; the index service will centralize to manage each subscriber's OCS address. When the CGF needs to route one subscriber CDR to OCS, the request will be sent to index server 801, the index service will determine the routing request shall be sent to which OCS.

Figure 9:
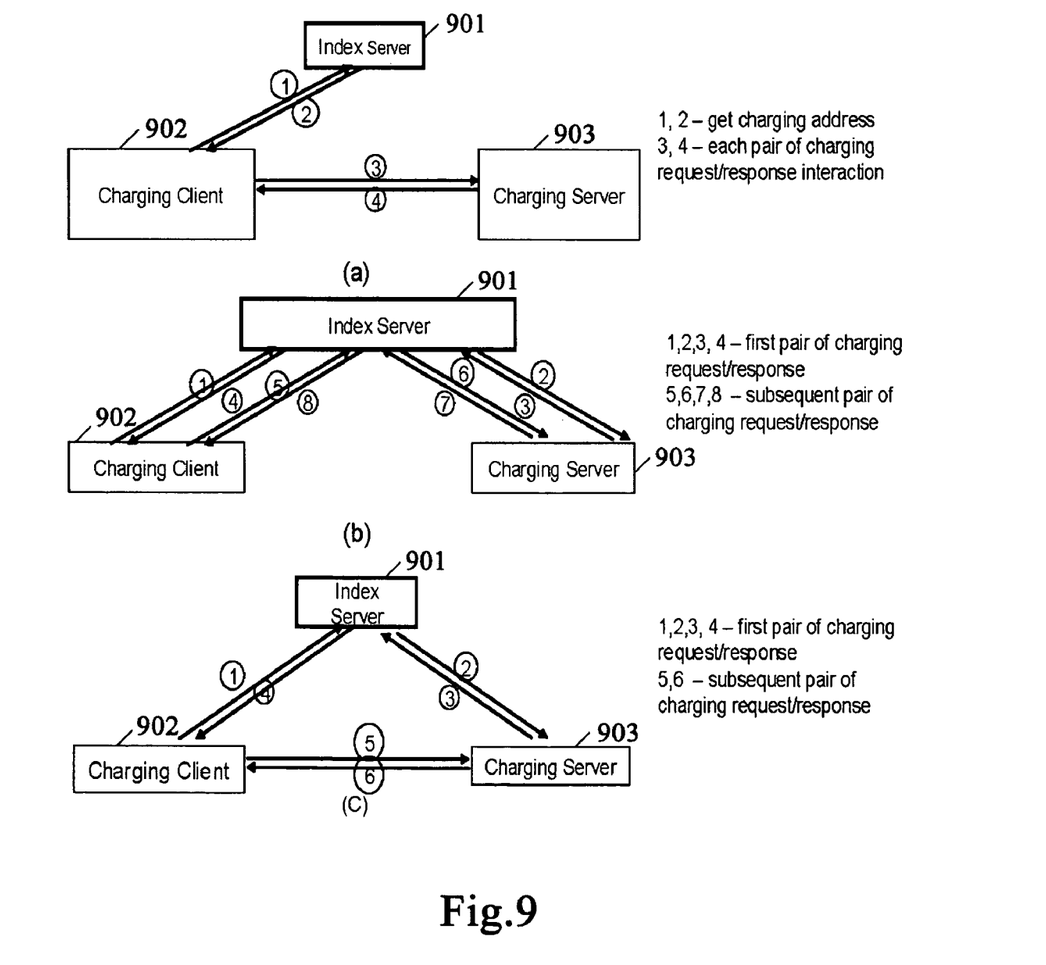
FIG. 9 is a schematic diagram showing the working modes of the charging location index server according to an embodiment of the present invention.

FIG. 9 is a schematic diagram showing the working modes of the charging location index server according to an embodiment of the present invention.

As shown in FIG. 9, the charging index server 901 supports the following two kinds of working mode:

1) Charging Server Address Query (see FIG. 9a)

The charging client 902 shall send the charging address query message to index server 901 to request the subscriber online/offline charging server address. The charging address query will include the following information Subscriber identifier, Charging address, which will be online charging or offline charging.

The charging index server 901 will query the index database to get the address of the subscriber's charging server 903, and return the retrieval result to the charging client 902.

Based on the subscriber address obtained from the index server 901, the charging client 902 will sent the charging request to the specified charging server 903.

2) Charging Request Redirection (see FIGS. 9b and 9c)

The charging client 902 shall send the charging request to the index server 901. The index server 901 will use the subscriber identifier in the charging request to query the index database to get the subscriber's charging server location address, the charging request will be redirected to the charging server 903 by the index server 901.

In the FIG. 9b, each charging request will always go to the index server 901, and then be redirected to the specified charging server 903 by the index server 901. In the FIG. 9c, the charging server 901 will return its charging location address to charging client 902, and charging client 902 will store the subscriber's charging location address in the charging response in the charging server 903. For the subsequent charging request for the same session for this subscriber, the charging request from the charging client 902 will bypass the index server 901, and directly be sent to the charging server 903.

For a group of subscribers, although they have close user group charging relationships, the storage locations of their profiles are distributed over multiple IMS charging systems. In this case, the index server is responsible to manage the storage locations of subscriber account profiles, and redirect charging requests coming from a core network, application servers, or one IMS charging system, to a specified IMS charging system based on a query result of index data of the subscribers.

The index server simplifies the topology of a distributed IMS charging network, and makes one charging entity's address transparent to another charging entity's address. When one charging entity needs to send charging request to another charging entity, the index server will know the location of another charging entity. The index server implements charging network topology hiding, with which one entity don't care for the physical deployment of another charging entity. This invention enables the operator to manage charging location information of the subscribers for distributed charging services in the centralized index server, instead of provisioning the charging locations in each separated IMS charging system. This invention greatly saves the operator's charging management cost.

The centralized index server enables multiple charging clients to route a charging request to a specified charging server. Each charging client is not necessary to maintain separated charging index data. This invention avoids the inconsistency of data when each charging client has a separated copy of the charging index data. It also saves the whole system's store space with the centralized index data. The centralized index server implements the index function reuse by the multiple charging clients. The centralized charging index server simplifies the topology and deployment of the charging network.

Though a method, apparatus and system for supporting distributed IMS charging have been described in details with some exemplary embodiments, these above embodiments are not exhaustive. Those skilled in the art may make various variations and modifications within the spirit and scope of the present invention. Therefore, the present invention is not limited to these embodiments; rather, the scope of the present invention is only defined by the appended claims.

The invention claimed is:

1. A system configured to support distributed IP Multimedia Subsystem (IMS) charging, comprising:
    a plurality of nodes and a index server interconnecting the plurality of nodes in a network;
    wherein a first node is configured to send a charging request to the Index server, and
    wherein the index server is configured to route the charging request to a second node; and wherein the second node is configured to charge based on the charging request or return an address of the second node to the first node; and wherein the first node is configured to send the charging request to the second node with the address from the index server; and
    wherein the second node is configured to charge based on the charging request.

2. The system according to claim 1, wherein the charging request includes a subscriber identifier and the index server is configured to determine the second node based on the subscriber identifier.

3. The system according to claim 1, wherein the index server further comprises a charging index database configured to store information about the plurality of nodes.

4. The system according to claim 3, wherein the information comprises the addresses of the plurality of nodes based on which the charging request is sent to the second node.

5. The system according to claim 4, wherein the information further comprises charging modes of the plurality of nodes based on which the index server is configured to select the second node for the first node.

6. The system according to claim 1, wherein the first node is any one of a charging trigger function, an online charging system or a charging gateway function, and the second node is any one of a charging data function, the charging gateway function, or the online charging system.

7. The system according to claim 1, wherein the network is a 3rd Generation Partnership Project (3GPP) network or a 3GPP2 network.

8. A method for supporting distributed IP Multimedia Subsystem (IMS) charging, comprising the steps of:
   sending a charging request to a index server in a network by a requesting node;
   routing the charging request to a charging node in the network by the index server, wherein the charging node is responsible for charging according to the charging request; or
   returning an address of the charging node to the requesting node by the index server, and, upon receipt, sending the charging request to the charging node with the address; and
   charging based on the charging request by the charging node.

9. The method according to claim 8, wherein the charging request comprises a subscriber identifier and the index server is configured to determine the charging node based on the subscriber identifier.

10. The method according to claim 8, further comprising the step of storing information about the nodes in a charging index database associated with the index server.

11. The method according to claim 10, wherein the information comprises the addresses of the nodes based on which the charging request is sent to the charging node.

12. The method according to claim 11, wherein the information further comprises charging modes of the nodes based on which the index server is configured to select the charging node for the requesting node.

13. The method according to claim 8, wherein the requesting node is any one of a charging trigger function, an online charging system and a charging gateway function, and the charging node is any one of a charging data function, the charging gateway function, or the online charging system.

14. The method according to claim 8, wherein the network is a 3rd Generation Partnership Project (3GPP) network or a 3GPP2 network.

* * * * *